Jan. 2, 1923.
G. WEISS.
CUTTING MACHINE.
FILED MAR. 18, 1922.
1,440,805
2 SHEETS-SHEET 1
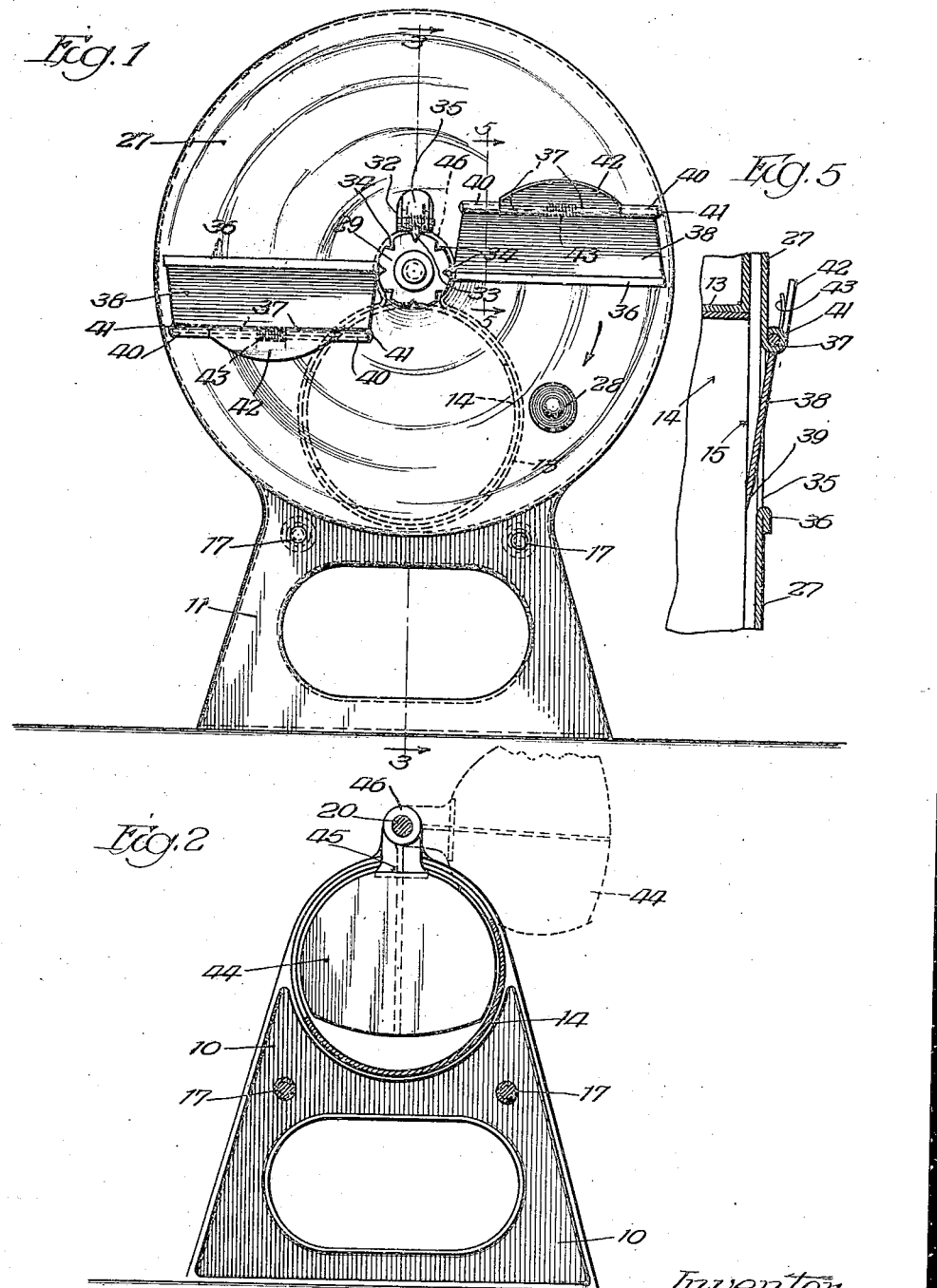
Inventor
George Weiss.

Jan. 2, 1923. 1,440,805
G. WEISS.
CUTTING MACHINE.
FILED MAR. 18, 1922.
2 SHEETS-SHEET 2
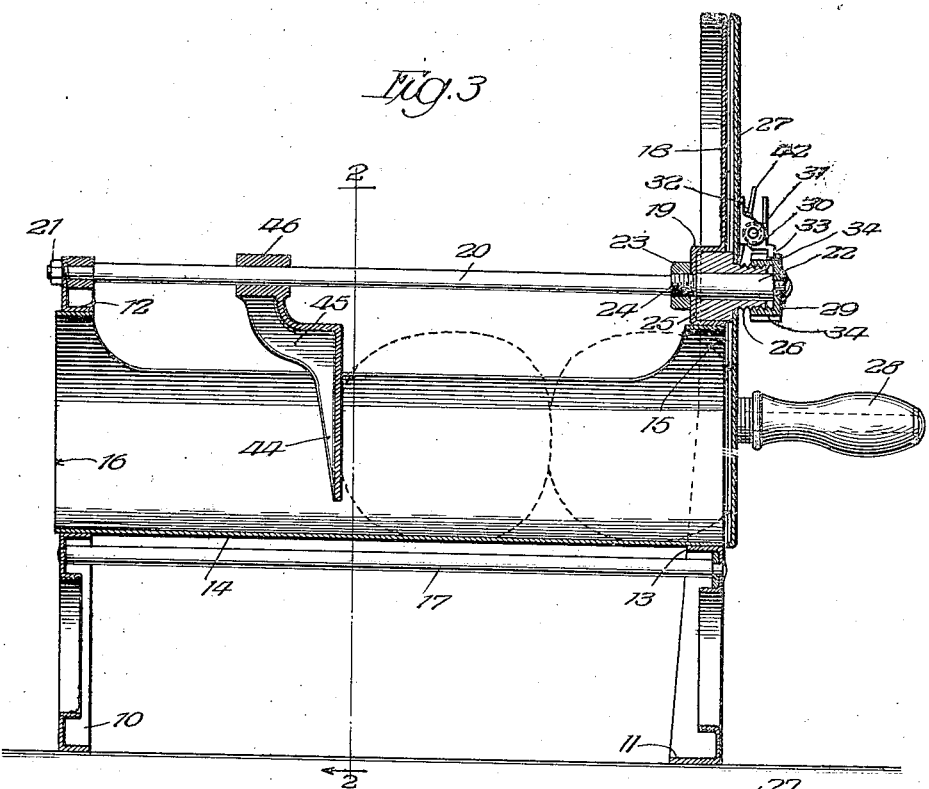
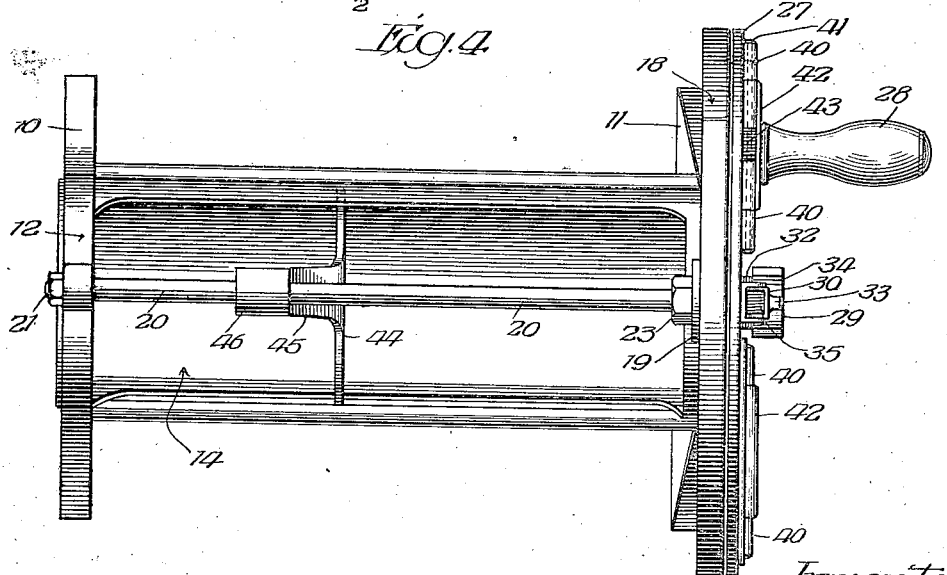
Inventor
George Weiss.
By [signature] Atty.

Patented Jan. 2, 1923.

1,440,805

UNITED STATES PATENT OFFICE.

GEORGE WEISS, OF CHICAGO, ILLINOIS.

CUTTING MACHINE.

Application filed March 18, 1922. Serial No. 544,766.

*To all whom it may concern:*

Be it known that I, GEORGE WEISS, a citizen of the United States, residing at Chicago, in the county of Cook and State of Illinois, have invented certain new and useful Improvements in Cutting Machines, of which the following is a specification.

This invention relates to improvements in cutting machines, for cutting or slicing vegetables and other similar articles, particularly adapted though not necessarily limited in its use for household purposes, and one of the objects of the invention is to provide an improved cutter of this character by means of which the article may be expeditiously cut or sliced.

A further object is to provide an improved machine of this character embodying means whereby the size or thickness of the slice may be varied at will.

To the attainment of these ends and the accomplishment of other new and useful objects as will appear, the invention consists in the features of novelty, in substantially the construction, combination and arrangement of the several parts hereinafter more fully described and claimed and shown in the accompanying drawings illustrating this invention and in which Figure 1 is a front elevation.

Figure 2 is a detail sectional view taken on line 2—2, Figure 3.

Figure 3 is a vertical sectional view taken on line 3—3, Figure 1.

Figure 4 is a top plan view.

Figure 5 is an enlarged detail sectional view taken on line 5—5, Figure 1.

Referring more particularly to the drawings the numerals 10 and 11 designate uprights for supporting the apparatus and these uprights may be of any desired size and configuration and constructed of any suitable material. They are, however, preferably constructed of sheet material and the rear upright 11 is shaped to form an opening having an inwardly projecting flange 12, encompassing the opening while the front upright 11 is provided with an opening in alinement with the opening in the rear upright and is provided with a flange 13 encompassing such opening. Within these openings thus formed there is arranged a casing 14, constructed of any suitable material of any desired configuration, the front of the casing is open as at 15 and if desired the rear of the casing may also be open as at 16.

The casing 14 is of a trough like configuration, the upper portion of which is cut away as shown more clearly in Figure 2, to form an entrance for the articles to be cut. This casing together with the uprights 10 and 11 may be secured together in any desired or suitable manner preferably by means of tie rods 17, any number of which may be provided.

The upright 11 preferably projects for a considerable distance above the top of the casing 16 as at 18, and this upwardly projection portion, above the casing 14, is recessed as at 19.

A guide bar or rod 20 is secured by one extremity as at 21 to the upright 10 and the forward portion of the guide 20 passes through a suitable opening in the base of the recessed portion 19 of the upright 18, the forward extremity 22 of the guide projecting through the recess 19 and extending for a short distance beyond the face of the upright 18. A fastening nut or collar 23 is threaded upon the guide 20 as at 24 and is adapted to abut the bottom wall of the recess 19. This collar 23 togther with the fastening 21 co-operate for securing the guide 20 in position and the guide together with the fastening devices also serve as a means for binding or securing the uprights 10 and 11 together.

A hub 25 is loosely mounted upon the bearing portion 22 of the guide 20 and this hub fits within the recess 19, the forward extremity of the hub being preferably reduced and provided with threads 26, for a purpose to be set forth.

Connected with the hub 25 for rotation therewith, in any desired or suitable manner, is a cutter carrying disc 27, which is of any desired diameter and the disc is adapted to be rotated by means of a suitable handle 28, the disc, when rotated will turn with the hub 25 about the bearing 22.

Connected with the bearing 22 so as to rotate loosely thereabout is a cap or nut 29, which is adapted for threaded engagement with the threads 26 on the reduced portion of the hub 25. This cap or nut 29, when the disc 27 is rotated, will turn freely with the disc and by adjusting the cap or nut 29 with relation to the hub 25 it will be manifest that the disc 27 may be laterally adjusted toward and away from the open end 15 of the casing 14.

In order to lock the cap or nut 29 against adjustment with relation to the hub 25, any suitable locking device may be provided. A simple and efficient locking device embodies a catch 30, which is pivotally mounted intermediate its ends as at 31, upon a bracket 32 carried by the disc 27. The nose or end 33 of the catch is adapted to enter recesses or grooves 34 in the periphery of the cap or nut 29. A spring 35 may be provided which operates upon the catch 30 in such a manner as to tend normally to move the nose or end 33 of the catch in a direction to enter one of the recesses 34. Thus, it will be seen that when the nose of the catch is seated in one of the recesses 34 the cap will be locked for rotation with the disc 27. When it is desired to laterally adjust the disc, the catch 30 is moved about its pivot so as to unseat the nose 33 from the recess 34, after which the cap or nut 29 may be adjusted to the desired extent to produce the desired lateral adjustment of the disc 27 so as to vary the thickness of the slices to be cut from the articles.

The disc 27 is provided with any desired number of openings 35, two being shown in the present exemplification of this invention. One edge of each of the openings 35 is preferably rolled back as at 36, while the other edge is shaped to form spaced knuckles 37, arranged in alinement with each other. A cutter member 38 is provided for each of the openings 35. This member 38 is provided with a cutting edge 39, while the opposite edge of the cutter is shaped to form spaced knuckles 40, which are adapted to be arranged in alinement with the knuckles 37 of the disc 27 and a fastening pin 41 passes through the registering knuckles so that the cutter 38 will be pivotally mounted upon the disc. A portion of the edge of the cutter 38 opposite to the cutting edge may be shaped to form a lip or projection 42, against one face of which lip one end of a spring 43 rests. The spring is preferably supported by the pin 41 intermediate adjacent knuckles and the other end of the spring rests against the face of the disc 27. The spring is provided as a means for holding the cutting edge 39 of the cutter 38 against the edge of the open end 15 of the casing 14, and also against the face of the portion 18 during the rotation of the disc 27, no matter to what extent a lateral adjustment is given to the disc 27. The lip 42 not only serves as a means for protecting the spring 43 but also acts as a guide for guiding the slice as it is cut from the article.

With this improved construction it will be manifest that the cutting edge 39 of the cutter 38 will be always maintained in close proximity or co-operative relation with the open end 15 of the casing 14, so that when the article is placed within the casing and fed forwardly the cutter will sever a slice therefrom upon each rotation of the disc. Obviously any number of these cutters may be mounted upon the disc and as the disc rotates, each cutter will sever a slice from the article.

The disc 27 also serves as a stop for limiting the forward or feeding movement of the article. That is to say, when the article is placed within the casing 14 and advanced to a position to have a slice cut therefrom the feeding movement of the article will be arrested by the engagement of the article with the inner face of the disc 27, and by adjusting the disc 27 with respect to the edge 15 of the casing 14 in the manner as already described, it will be manifest that the thickness of the slices may be varied.

Any suitable means may be provided for advancing or feeding the article to the cutter. A simple and efficient means embodies a follower 44, which is provided with a lateral and rearwardly deflected portion 45, connected to which portion 45 is a bearing 46, through which the guide 20 passes. The follower 44 is adapted to be moved freely forwardly and backwardly by sliding the same upon the guide 20. This follower 44 is of a configuration to conform to the contour of the casing 14, and when desired the follower may be swung about the guide 20, so as to be moved out of the casing 14, and at which time the follower may be supported in its inactive position, as shown more clearly in dotted lines in Figure 2, by the engagement of a portion of the follower with the edge of the casing 14.

Obviously any number of notches or grooves 34 may be provided in the cap or nut 29, according to the degree of lateral adjustment that it is desired to impart to the disc 27.

While the preferred form of the invention has been herein shown and described, it is to be understood that various changes may be made in the details of construction and in the combination and arrangement of the several parts, within the scope of the claims, without departing from the spirit of this invention.

What is claimed as new is:—

1. A cutting machine embodying a casing open at one end, a rotary disc mounted adjacent said end, a cutter carried by the disc, said disc serving as a stop for limiting the feeding movement of the article, and positive means operating upon the disc for adjusting the said disc laterally to vary the thickness of the slices.

2. A cutting machine embodying a casing open at one end, a rotary disc mounted adjacent one end, a spring controlled cutter pivotally mounted upon the disc and co-operating with the said end of the casing to cut the article, said disc serving as a stop for limiting the feeding movement of the article, and positive means operating upon the disc for laterally adjusting the disc to vary the thickness of the slice.

3. A cutting machine embodying a casing open at one end, a rotary disc mounted adjacent one end, a spring adjusted cutter pivotally mounted upon the disc and co-operating with the said end of the casing to cut the article, said disc serving as a stop for limiting the feeding movement of the article, and positive means operating upon the disc for laterally adjusting the disc with respect to the adjacent edge of the casing while the position of the cutting edge of the cutter with respect to said edge remains constant.

4. A cutting machine embodying a casing open at one end, a rotary disc mounted adjacent one end, a spring adjusted cutter pivotally mounted upon the disc and co-operating with the said end of the casing to cut the article, said disc serving as a stop for limiting the feeding movement of the article, positive means operating upon the disc for laterally adjusting the disc to vary the thickness of the slice, and a follower movable in the casing for advancing the articles.

5. A cutting machine embodying a casing open at one end, a rotary disc mounted adjacent one end, a spring adjusted cutter pivotally mounted upon the disc and co-operating with the said end of the casing to cut the article, said disc serving as a stop for limiting the feeding movement of the article, positive means operating upon the disc for laterally adjusting the disc to vary the thickness of the slice, and a follower movable in the casing for advancing the articles.

6. A cutting machine embodying a casing open at one end, a follower guide disposed above the bottom of the casing and extending lengthwise thereof, one end of the guide extending beyond the open end of the casing to form a bearing, a disc rotatable about said bearing and adjacent the open end of the casing, a cutter carried by the disc and co-operating with the edge of the open end of the casing, a follower in the casing, and means operating upon the disc for laterally adjusting the said disc for varying the thickness of the slices.

7. A cutting machine embodying a casing having an open end, a bearing, a disc supported by and freely rotatable about the bearing and adjacent the said end of the casing, a cutter supported by the disc and co-operating with said end, and means for laterally adjusting the disc upon the said bearing while the position of the cutting edge of the cutter with respect to the said end of the casing remains constant, the said means operating upon the disc and embodying two co-operating elements one of which elements is operatively connected with the disc and the other with the said bearing.

8. A cutting machine embodying a casing having an open end, a bearing, a disc supported by and freely rotatable about the bearing and adjacent the said end of the casing, a cutter supported by the disc and co-operating with said end, means for laterally adjusting the disc upon the said bearing while the position of the cutting edge of the cutter with respect to the said end of the casing remains constant, the said means operating upon the disc and embodying two co-operating elements one of which elements is operatively connected with the disc and the other with the said bearing, and means for locking the said elements against relative movement.

9. A cutting machine embodying a casing having an open end, a bearing, a disc supported by and freely rotatable about the bearing and adjacent the said end of the casing, a cutter supported by the disc and co-operating with said end, means for laterally adjusting the disc upon the said bearing while the position of the cutting edge of the cutter with respect to the said end of the casing remains constant, the said means embodying two co-operating elements one of which elements is operatively connected with the disc and the other with the said bearing, and means for locking the said elements against relative movement, the last recited means embodying a spring controlled catch, the other element having recesses adapted to receive the catch.

10. A cutting machine embodying a casing having an open end, a stationary bearing, a disc supported by and rotatable about the bearing and adjacent said open end of the casing, a cutter supported by the disc and co-operating with said end, and means for laterally adjusting the disc upon the bearing while the cutting edge of said cutter is maintained in close proximity to the said end, the said means operating upon the disc and embodying two elements having threaded connection for relative adjustment, one of said elements being fixedly connected with the disc to rotate therewith and the other element having a fixed but rotatable connection with said bearing.

11. A cutting machine embodying a casing having an open end, a stationary bearing, a disc supported by and rotatable about the bearing and adjacent said open end of the casing, a cutter supported by the disc and co-operating with said end, means for laterally adjusting the disc upon the bearing while the cutting edge of said cutter is maintained in close proximity to the said end, the said means operating upon the disc and embodying two elements having threaded connection for relative adjustment, one of said elements being fixedly connected with the disc to rotate therewith and the other element having a fixed but rotatable connection with said bearing, and locking means for maintaining the said elements against relative adjustment.

12. A cutting machine embodying a casing having an open end, a stationary bearing, a disc supported by and rotatable about the bearing and adjacent said open end of the casing, a cutter supported by the disc and co-operating with said end, means for laterally adjusting the disc upon the bearing while the cutting edge of said cutter is maintained in close proximity to the said end, the said means embodying two elements having threaded connection for relative adjustment, one of said elements being fixedly connected with the disc to rotate therewith and the other element having a fixed but rotatable connection with said bearing, one of the said elements having a plurality of recesses or grooves, and a latch device operatively connected with the other of the said elements and adapted to enter said recesses for maintaining the said elements against relative adjustment.

13. A cutting machine embodying a casing open at one end, a rotary disc mounted adjacent one end, a spring controlled cutter pivotally mounted upon the disc and co-operating with the said end of the casing to cut the article, said disc serving as a stop for limiting the feeding movement of the article, means operating upon the disc for laterally adjusting the disc to vary the thickness of the slice, a follower in the casing for advancing the article, and means constituting a stop for limiting the feeding movement of the follower, said follower being also adapted to be swung out of the casing.

In testimony whereof I have signed my name to this specification, on this 15th day of March, A. D. 1922.

GEORGE WEISS.